(12) United States Patent
Matsuo

(10) Patent No.: US 8,942,545 B2
(45) Date of Patent: Jan. 27, 2015

(54) CONTENT RECEPTION DEVICE AND CONTENT ACCUMULATION METHOD

(75) Inventor: Hisaaki Matsuo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 13/885,107

(22) PCT Filed: Feb. 15, 2012

(86) PCT No.: PCT/JP2012/053452
§ 371 (c)(1),
(2), (4) Date: May 13, 2013

(87) PCT Pub. No.: WO2012/132591
PCT Pub. Date: Oct. 4, 2012

(65) Prior Publication Data
US 2013/0230301 A1 Sep. 5, 2013

(30) Foreign Application Priority Data
Mar. 25, 2011 (JP) ................................. 2011-067779

(51) Int. Cl.
*H04N 5/761* (2006.01)
*H04N 9/79* (2006.01)
*H04N 5/775* (2006.01)
*H04N 21/433* (2011.01)
*H04N 21/458* (2011.01)

(52) U.S. Cl.
CPC ................. *H04N 9/79* (2013.01); *H04N 5/775* (2013.01); *H04N 21/4334* (2013.01); *H04N 21/4583* (2013.01)
USPC ........................................................ 386/292

(58) Field of Classification Search
CPC ..... H04N 5/775; H04N 9/79; H04N 21/4583; H04N 21/4334
USPC ............................................................ 386/292
See application file for complete search history.

(56) References Cited

U.S. PATENT DOCUMENTS

2001/0021995 A1* 9/2001 Hatano ........................... 725/50
2009/0016695 A1* 1/2009 Masuda et al. ................ 386/124
2010/0124402 A1* 5/2010 Minobe ........................... 386/63

FOREIGN PATENT DOCUMENTS

| JP | 2003-223385 A | 8/2003 |
| JP | 2006-173759 A | 6/2006 |
| JP | 2008-134992 A | 6/2008 |
| WO | WO 2006/041060 A1 | 4/2006 |

* cited by examiner

*Primary Examiner* — Thai Tran
*Assistant Examiner* — William Tran
(74) *Attorney, Agent, or Firm* — Birch, Stewart, Kolasch & Birch, LLP

(57) ABSTRACT

Even if times of accumulation of a plurality of contents overlap, each of the contents can be accumulated, and accumulation of the contents can be completed in time for the time and date when the contents are made public. A non-volatile storage portion (23) stores information regarding times of publication of a plurality of contents. When candidate times for the times of accumulation of the plurality of contents overlap, an accumulation time setting portion (24b) determines the order of the times of publication among the plurality of contents on the basis of the information regarding the times of publication stored in the non-volatile storage portion (23), and sets the time of accumulation for each content on the basis of the assessment result. A content accumulation portion (24c) accumulates the contents on the basis of the times of accumulation set by the accumulation time setting portion (24b).

4 Claims, 4 Drawing Sheets

CONTENT RECEPTION DEVICE AND CONTENT ACCUMULATION METHOD

TECHNICAL FIELD

The present invention relates to a content reception device for receiving a plurality of contents and a content accumulation method of accumulating the contents.

BACKGROUND ART

In digital broadcasting, an accumulation-type broadcast has been proposed recently in which a content broadcasted by using radio frequencies is accumulated in a reception device, and the accumulated content is viewed by a user. In the accumulation-type broadcast, a user does not need to view a content at the same time as the content is received and is able to view the content anytime the user desires.

To accumulate a content, a user reserves accumulation of the content by operating the reception device. Broadcast information of the content (such as an identifier, a broadcast time and the like of the content) required for a reservation is broadcasted before the content is broadcasted. For example, broadcast information of a content is broadcasted in a format prescribed in "3.2.4.2 ProgramLocation" in "CODING, TRANSMISSION AND STORAGE SPECIFICATION FOR BROADCASTING SYSTEM BASED ON HOME SERVERS, ARIB STD-B38, version 2.0, (Association of Radio Industries and Businesses, Apr. 26, 2010, revised to version 2.0)".

The reception device having received the broadcast information of the content displays broadcast schedule information of the content on a screen on the basis of the broadcast information. The user views the broadcast schedule information to make an accumulation reservation of the content.

In the meantime, in the accumulation-type broadcast, in a case where a user makes an accumulation reservation of a plurality of contents to be broadcasted in different broadcast channels, there is a possibility that broadcast times of these contents overlap with each other. In a case where the broadcast times overlap with each other, these contents are not allowed to be accumulated due to constraints of hardware of a reception device in some cases. For example, in a case where only one tuner is mounted on a reception device, the reception device, while receiving a certain content, is not able to receive another content, and thus not able to accumulate all the contents.

Therefore, Patent Literature 1 discloses a content reception/recording device for deciding, in a case where transmission times of a plurality of contents overlap with each other, priority of accumulation and accumulating the contents according to the priority. In the device, the priority is decided according to remaining numbers of transmission opportunities of the contents, size of an amount of data which has not been accumulated of the contents, time required for accumulating data which has not been accumulated of the contents, accumulation completion time of the contents, and a type or a channel which is highly likely to be viewed by a user.

PRIOR ART DOCUMENT

Patent Documents

Patent Document 1: WO2006/041060

SUMMARY OF THE INVENTION

Problem to be Solved by the Invention

In the accumulation-type broadcast, a time and date of publication of a content is designated in advance in some cases. A time and date of publication of a content is a start point of a period when a user is able to view a content. For example, the "3.2.4.3 ServiceInformation" in the above-described "CODING, TRANSMISSION AND STORAGE SPECIFICATION FOR BROADCASTING SYSTEM BASED ON HOME SERVERS, ARIB STD-B38, version 2.0, (Association of Radio Industries and Businesses, Apr. 26, 2010, revised to version 2.0)" prescribes that a time and date of publication of a content is set with a parameter "ValidFrom".

However, the conventional art of the above-described Patent Literature 1 has a problem that even though a time and date of publication of a content elapsed, in a case where the content is not accumulated in a reception device yet, the user is not able to view the content immediately. That is, even though priority is decided by the remaining numbers of transmission opportunities of contents or the like, a content is not always accumulated in time for a time and date of publication thereof, and there is a possibility that accumulation of a content having an earlier time and date of publication is left until later. Further, in a case where accumulation of a content is not completed by a time and date of publication thereof, a method of using service on the Internet for providing content data and the like to complement content data is conceivable so that a user views the content, but there is a problem that the method costs telecommunication fees.

In view of the problems described above, the present invention aims to provide a content reception device and a content accumulation method capable of accumulating, even in a case where times of accumulation of a plurality of contents overlap with each other, each content as well as completing accumulation of the contents to be in time for times and dates of publication thereof.

Means for Solving the Problem

To solve the above problems, a first technical means of the present invention is a content reception device for receiving a plurality of contents, comprising: a storage portion for storing information regarding times of publication of the plurality of contents; an accumulation time setting portion for determining, in a case where candidate times for times of accumulation of the plurality of contents overlap with each other, an order of the times of publication among the plurality of contents on the basis of the information regarding the times of publication stored in the storage portion, and setting a time of accumulation for each content on the basis of the determination result; and a content accumulation portion for accumulating the each content on the basis of times of accumulation set by the accumulation time setting portion.

A second technical means is the content reception device of the first technical means, wherein the plurality of contents include a first content and a second content; and the accumulation time setting portion determines, in a case where a candidate time for a time of accumulation of the first content and a candidate time for a time of accumulation of the second content overlap with each other, an order of times of publication between the first content and the second content, sets a time of accumulation of the first content to the candidate time for the time of accumulation of the first content in a case where a time of publication of the second content is later than a time of publication of the first content, and a time of accumulation of the second content to a time when the second content is broadcasted which is later than the candidate time for the time of accumulation of the first content.

A third technical means is the content reception device of the second technical means wherein the plurality of contents further include a third content; and the accumulation time setting portion determines, in a case where a time when the second content is broadcasted and a candidate time for a time of accumulation of the third content overlap with each other, an order of times of publication between the second content and the third content, and sets a time of accumulation of the third content to a time when the third content is broadcasted which is later than a time of accumulation of the second content in a case where a time of publication of the third content is later than a time of publication of the second content.

A fourth technical means is the content reception device of the second technical means, wherein the accumulation time setting portion sets, in a case where a time of accumulation of the second content is later than a time of publication of the second content, a time of accumulation of the second content to a candidate time for a time of accumulation of the first content and a time of accumulation of the first content to a time when the first content is broadcasted which is later than the candidate time for the time of accumulation of the first content.

A fifth technical means is the content reception device of the forth technical means, wherein the accumulation time setting portion sets a time of accumulation of the first content to a time when the first content is broadcasted which is earlier than a time of publication of the first content.

A sixth technical means is a content accumulation method for accumulating a plurality of contents, comprising: an accumulation time setting step of reading, in a case where candidate times for times of accumulation of the plurality of contents overlap with each other, information regarding times of publication of the plurality of contents from a storage portion, determining an order of the times of publication among the plurality of contents on the basis of the read information regarding the times of publication, and setting a time of accumulation for each content on the basis of the determination result; and a content accumulation step of accumulating the each content on the basis of times of accumulation set at the accumulation time setting step.

EFFECT OF THE INVENTION

According to the present invention, even in a case where times of accumulation of a plurality of contents overlap with each other, each content is able to be accumulated and accumulation of the contents is able to be completed to be in time for times and dates of publication, and thus a user is able to immediately view a content having an elapsed time and date of publication.

PREFERRED EMBODIMENT OF THE INVENTION

Figure 1:
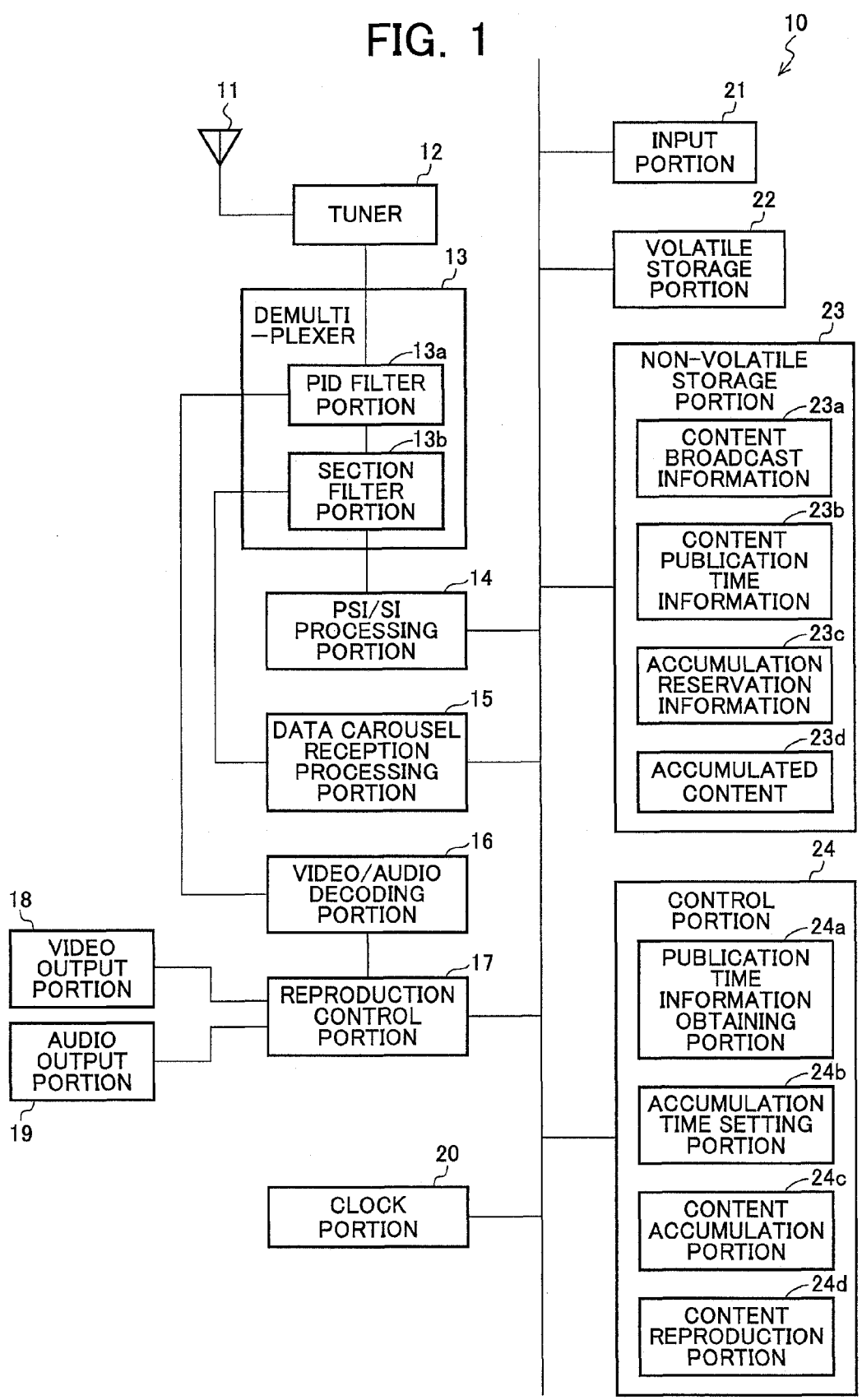
FIG. 1 is a block diagram showing an example of a configuration of a content reception device according to the present invention.

Hereinafter, description will be given in detail for embodiments of the present invention with reference to the drawings. First, description will be given for an example of a configuration of a content reception device according to the present invention. FIG. 1 is a block diagram showing an example of a configuration of a content reception device 10 according to the present invention.

As shown in FIG. 1, the content reception device 10 is provided with an antenna 11, a tuner 12, a demultiplexer 13, a PSI/SI processing portion 14, a data carousel reception processing portion 15, a video/audio decoding portion 16, a reproduction control portion 17, a video output portion 18, an audio output portion 19, a clock portion 20, an input portion 21, a volatile storage portion 22, a non-volatile storage portion 23, and a control portion 24.

The antenna 11 is an antenna for receiving a broadcast signal of a content to output the received broadcast signal to the tuner 12. The tuner 12 is a tuner for selecting a channel of a station designated by a user via the input portion 21 to perform demodulation, error correction or the like of a broadcast signal to be broadcasted using the channel for outputting the resulting TS (Transport Stream) to the demultiplexer 13.

The demultiplexer 13 is a processing portion for separating each data of a video, audio and data broadcasting multiplexed in the TS. The demultiplexer 13 is provided with a PID filter portion 13a and a section filter portion 13b. The PID filter portion 13a is a processing portion for referring to a PID (Packet ID) included in a TS packet constituting the TS to output the TS packet in a stream format to the video/audio decoding portion 16 while outputting the TS packet in a section format to the section filter portion 13b.

The section filter portion 13b is a processing portion for receiving the TS packet in the section format from the PID filter portion 13a to output the TS packet including PSI/SI (Program Specific Information/Service Information) to the PSI/SI processing portion 14 and the TS packet including content data to the data carousel reception processing portion 15. Here, the PSI/SI is content broadcast information including information of an identifier of a content to be broadcasted, a broadcast time (a broadcasting date and a broadcast time zone) of the content, a time and date of publication of the content and the like.

The PSI/SI processing portion 14 is a processing portion for obtaining the PSI/SI included in the TS packet received from the section filter portion 13b to output the obtained PSI/SI to a publication time information obtaining portion 24a that is described below.

The data carousel reception processing portion 15 is a processing portion for generating content data to be accumulated from content data included in the TS packet received from the section filter portion 13b to store the generated content data in the non-volatile storage portion 23. The content data is data transmitted by a data carousel method from a broadcast station.

The video/audio decoding portion 16 is a processing portion for receiving the TS packet in the stream format from the PID filter portion 13a to decode the received TS packet for generating a video signal and an audio signal, then outputting the generated video signal and audio signal to the reproduction control portion 17.

The reproduction control portion 17 is a processing portion for receiving a video signal and an audio signal from the video/audio decoding portion 16 to perform synchronous processing for synchronizing the video signal and the audio signal for outputting the video signal to the video output portion 18 and the audio signal to the audio output portion 19. The video output portion 18 is a display device such as a liquid crystal display. The audio output portion 19 is an audio output device such as a speaker.

The clock portion 20 is a processing portion for clocking a time and date. The input portion 21 is an input device for receiving an input operation of information from a user such as an input key, a touch panel and a remote control. The volatile storage portion 22 is a storage device for temporarily storing data such as a volatile memory.

The non-volatile storage portion 23 is a storage device such as a hard disk device and a non-volatile memory. The non-volatile storage portion 23 stores content broadcast information 23a, content publication time information 23b, accumulation reservation information 23c, an accumulated content 23d, and the like.

The content broadcast information 23a is information of a broadcast time (a broadcasting date and a broadcast time zone) of a content that is associated with an identifier of the content for storage. The content publication time information 23b is information of a time and date of publication of a content that is associated with an identifier of the content for storage. The content broadcast information 23a and the content publication time information 23b are information to be registered by the publication time information obtaining portion 24a that is described below.

The accumulation reservation information 23c is information of a time of accumulation that is associated with an identifier of a content for storage. The time of accumulation is a date and a time zone when a content is accumulated. The accumulation reservation information 23c is information set by a user who operates the input portion 21, or information set by an accumulation time setting portion 24b that is described below. The accumulated content 23d is data of the accumulated content. The accumulated content 23d is registered by the data carousel reception processing portion 15.

The control portion 24 is a processing portion for controlling the whole of the content reception device 10. The control portion 24 is provided with the publication time information obtaining portion 24a, the accumulation time setting portion 24b, a content accumulation portion 24c and a content reproduction portion 24d.

The publication time information obtaining portion 24a is a processing portion for receiving the PSI/SI from the PSI/SI processing portion 14 to obtain, from the received PSI/SI, information of an identifier of a content and a time and date of publication of the content for storing the obtained information in the non-volatile storage portion 23 as the content publication time information 23b. Further, the publication time information obtaining portion 24a obtains information of a broadcast time of a content included in the PSI/SI to store the obtained information in the non-volatile storage portion 23 as the content broadcast information 23a.

The accumulation time setting portion 24b is a processing portion for setting a time of accumulation of a content based on the content broadcast information 23a and the content publication time information 23b to associate information of the set time of accumulation with information of an identifier of the content to be stored in the non-volatile storage portion 23 as the accumulation reservation information 23c.

The accumulation time setting portion 24b sets a time of accumulation of a content in the case of receiving a setting operation of an accumulation reservation of a content (setting operation of a content to be accumulated and a date and a time zone to be accumulated) by a user via the input portion 21. Alternatively, in a case where content accumulation processing is unsuccessfully performed by the content accumulation portion 24c that is described below and determination is made that it needs to accumulate again the content in subsequent broadcast, the accumulation time setting portion 24b sets a time of accumulation of the content.

Alternatively, the accumulation time setting portion 24b includes an automatic reservation function, and in a case where a content (recommended content, etc.) and a date and a time zone for accumulating the content are appointed by the automatic reservation function, sets a time of accumulation of the content.

In an automatic reservation, the accumulation time setting portion 24b reads information of a broadcast time of a content conforming to a predetermined standard from the content broadcast information 23a. Here, the predetermined standard is, for example, recording frequency of past contents. For example, in a case where movie contents have been accumulated in past times by a user at predetermined frequency or more, information of a broadcast time of a movie content is read.

Then, the accumulation time setting portion 24b makes an accumulation reservation to accumulate the content in the read broadcast time. Note that, information of recording frequency of contents may be stored in the non-volatile storage portion 23. In this manner, in the case of appointing a time to accumulate a content by the automatic reservation function, the accumulation time setting portion 24b sets a time of accumulation of the content.

Figure 2:
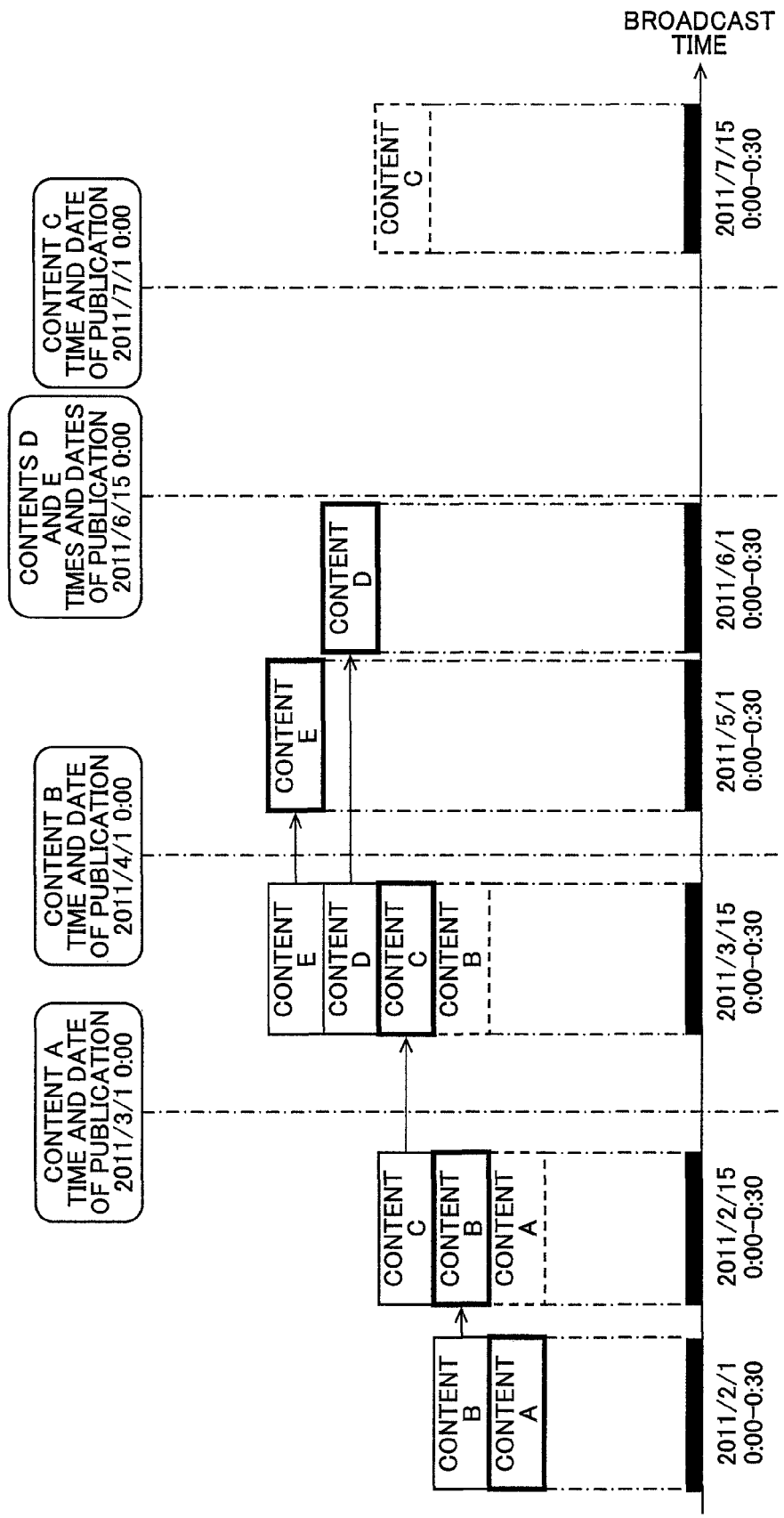
FIG. 2 is a diagram for explaining an example of content accumulation time setting processing according to the present invention.

FIG. 2 is a diagram for explaining an example of content accumulation time setting processing according to the present invention. FIG. 2 shows an example for setting times of accumulation of contents A to E. In a case where times of accumulation of a plurality of contents overlap with each other, the accumulation time setting portion 24b preferentially sets a time of accumulation of a content having an earlier time and date of publication to the overlapped time of accumulation. That is, in a case where times of accumulation of a plurality of contents overlap with each other, a time of accumulation of a content having an earlier time and date of publication is not changed. Then, the accumulation time setting portion 24b sets a time of accumulation of a content having a later time and date of publication to a broadcast time of the content having the later time and date of publication after the time of accumulation of the content having the earlier time and date of publication. Note that, the accumulation time setting portion 24b determines the order of times of publication and times of accumulation of a plurality of contents according to the order of start points of respective times.

For example, in FIG. 2, the content A is scheduled to be broadcasted twice (from 0:00 on Feb. 1, 2011 to 0:30 on Feb. 1, 2011, and from 0:00 on Feb. 15, 2011 to 0:30 on Feb. 15, 2011), while the content B is scheduled to be broadcasted three times (from 0:00 on Feb. 1, 2011 to 0:30 on Feb. 1, 2011, from 0:00 on Feb. 15, 2011 to 0:30 on Feb. 15, 2011, and from 0:00 on Mar. 15, 2011 to 0:30 on Mar. 15, 2011). Additionally, times of accumulation (0:00 on Feb. 1, 2011 to 0:30 on Feb. 1, 2011) of the contents A and B overlap with each other.

In this case, the accumulation time setting portion 24b sets a time of accumulation of the content A having an earlier publication time (to be shown to the public at 0:00 on Mar. 1, 2011) to the overlapped time (from 0:00 on Feb. 1, 2011 to 0:30 on Feb. 1, 2011) and a time of accumulation of the content B having a later time of publication (to be shown to the public at 0:00 on Apr. 1, 2011) to a next broadcast time of the content B (from 0:00 on Feb. 15, 2011 to 0:30 on Feb. 15, 2011).

However, in the example of FIG. 2, as a result of setting of the time of accumulation of the content B to the next broadcast time, the time of accumulation of the content B overlaps again with the time of accumulation of the content C. Therefore, the accumulation time setting portion 24b preferentially sets the time of accumulation of the content B having the time and date of publication earlier than that of the content C (the content B is shown to the public at 0:00 on Apr. 1, 2011, and the content C is shown to the public at 0:00 on Jul. 1, 2011) to the overlapped time of accumulation (from 0:00 on Feb. 15, 2011 to 0:30 on Feb. 15, 2011). Further, the accumulation time setting portion 24b sets the time of accumulation of the content C to a broadcast time of the content C (from 0:00 on Mar. 15, 2011 to 0:30 on Mar 15, 2011) after the time of accumulation of the content B having an earlier time and date of publication.

However, in a case where a time of accumulation of a content having a later time and date of publication is delayed so that a time and date to start to accumulate the content is later than the time and date of publication, the accumulation time setting portion 24b does not perform processing for delaying the time of accumulation of the content having a later time and date of publication. Alternatively, the accumulation time setting portion 24b performs processing for delaying a time of accumulation of a content having an earlier time and date of publication when a time and date to start accumulation of a content having an earlier time and date of publication is not later than the time and date of publication even though a time of accumulation thereof is delayed.

In the example of FIG. 2, as a result of delaying the time of accumulation of the content C, times of accumulation of the contents C, D and E (from 0:00 on Mar. 15, 2011 to 0:30 on Mar. 15, 2011) overlap with each other. In this case, in a case where the time of accumulation of the content C having a time and date of publication later than those of the contents D and E (the time and date of publication of the contents D and E is at 0:00 on Jun. 15, 2011, while the time and date of publication of the content C is at 0:00 on Jul. 1, 2011) is delayed to be set to a next broadcast time of the content C (from 0:00 on Jul. 15, 2011 to 0:30 on Jul. 15, 2011), a time and date to start to accumulate the content C (0:00 on Jul. 15, 2011) is later than the time and date of publication of the content C (0:00 on Jul. 1, 2011).

Therefore, the accumulation time setting portion 24b does not perform processing for delaying the time of accumulation of the content C having a later time and date of publication. Alternatively, the accumulation time setting portion 24b performs processing for delaying the times of accumulation of the contents D and E having the times and dates to start accumulation thereof that are not later than the times and dates of publication even though the times of accumulation are delayed. Specifically, the accumulation time setting portion 24b sets the time of accumulation of the contents D and E to broadcast times of the contents D and E (from 0:00 on Jun. 1, 2011 to 0:30 on Jun. 1, 2011, and from 0:00 on May 1, 2011 to 0:30 on May 1, 2011) having times and dates to start broadcast that are earlier than the times and dates of publication of the contents D and E.

In this manner, the accumulation time setting portion 24b sets the time of accumulation of each content without being overlapped. At the time, the accumulation time setting portion 24b may set a time of accumulation of a content so as to be earlier than a time of publication of the content, thus allowing a user to view the content at the same time that the time of publication of the content comes.

Note that, in a case where times of accumulation of contents overlap with each other and it needs to delay a time of accumulation of any of the contents to a next broadcast time thereof, however, any of the contents are not scheduled to be broadcasted before the time and date of publication, it is impossible to set the time of accumulation of the content to a next broadcast time thereof.

In this case, the accumulation time setting portion 24b outputs a message indicating that the time of accumulation is unsuccessfully set to the reproduction control portion 17 to display the message on the video output portion 18. On the other hand, in the case of successfully setting the time of accumulation of the content without being overlapped, the accumulation time setting portion 24b outputs a list of information of the set times of accumulation to the reproduction control portion 17 to display the list of information on the video output portion 18.

The content accumulation portion 24c is a processing portion for accumulating a content based on the information of times of accumulation that are set by the accumulation time setting portion 24b. Specifically, the content accumulation portion 24c reads the accumulation reservation information 23c from the non-volatile storage portion 23. Then, in a case where a time and date clocked by the clock portion 20 coincides with a time and date to start accumulation of the time of accumulation registered in the accumulation reservation information 23c, the content accumulation portion 24c controls the tuner 12, the PID filter portion 13a, the section filter portion 13b and the data carousel reception processing portion 15 to store content data corresponding to the time of accumulation in the non-volatile storage portion 23 as the accumulated content 23d.

Additionally, the content accumulation portion 24c outputs, in the case of unsuccessfully accumulating a content and determining that it needs to accumulate again the content at the time of subsequent broadcast, a setting request of the time of accumulation of the content to the accumulation time setting portion 24b. The case where a content is unsuccessfully accumulated is the case where it is impossible to receive a broadcast signal to broadcast the content, or the like, for example.

The content reproduction portion 24d is a processing portion for controlling reproduction of a content that is stored in the non-volatile storage portion 23 as the accumulated content 23d. The content reproduction portion 24d reads the accumulated content 23d from the non-volatile storage portion 23 to generate a video signal and an audio signal from the accumulated content 23d. Then, the content reproduction portion 24d outputs the generated video signal and audio signal to the reproduction control portion 17 to reproduce the video signal and the audio signal in the reproduction control portion 17.

Figure 3:
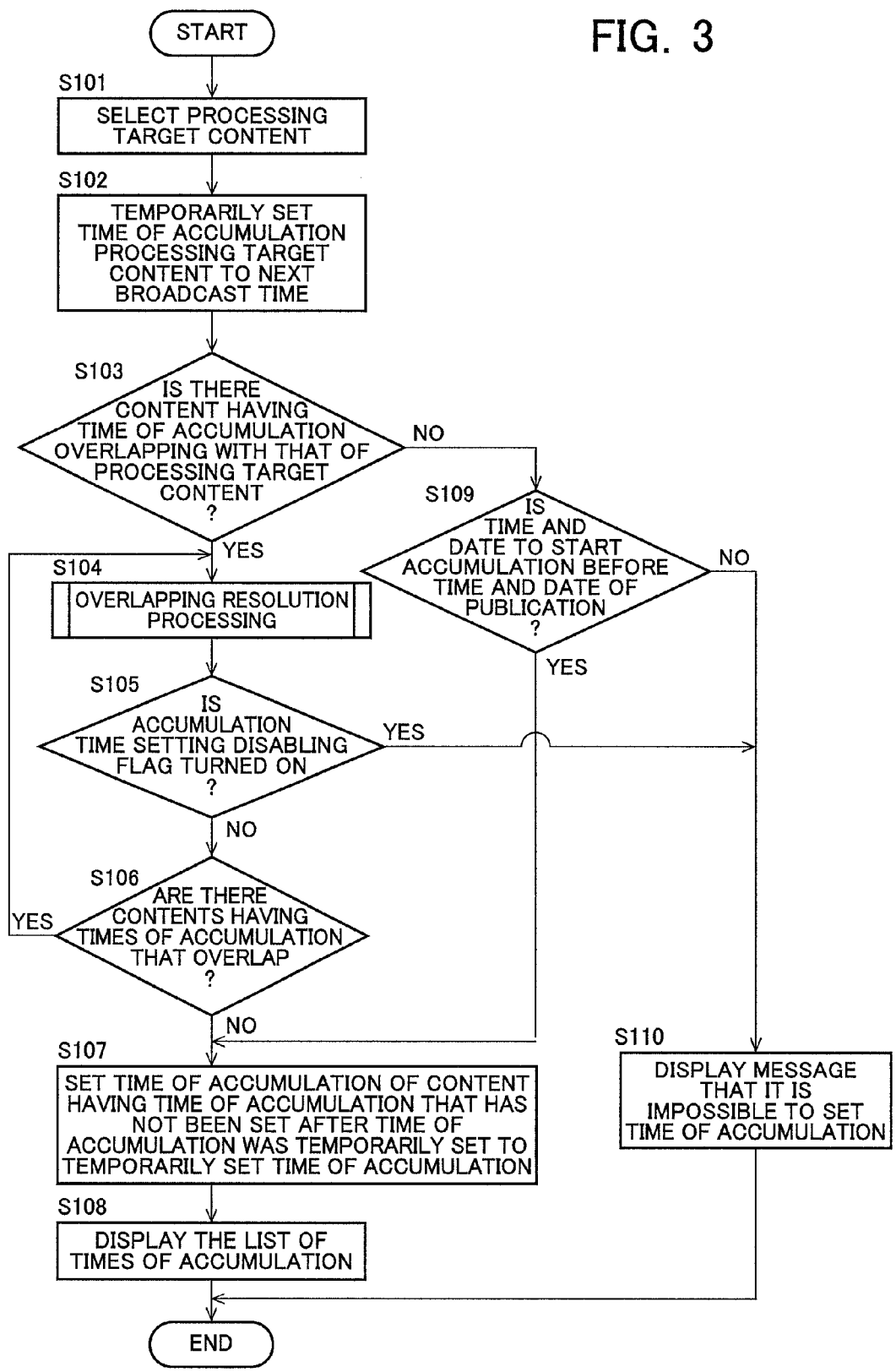
FIG. 3 is a flowchart showing an example of a processing procedure of content accumulation time setting processing according to the present invention.
Figure 4:
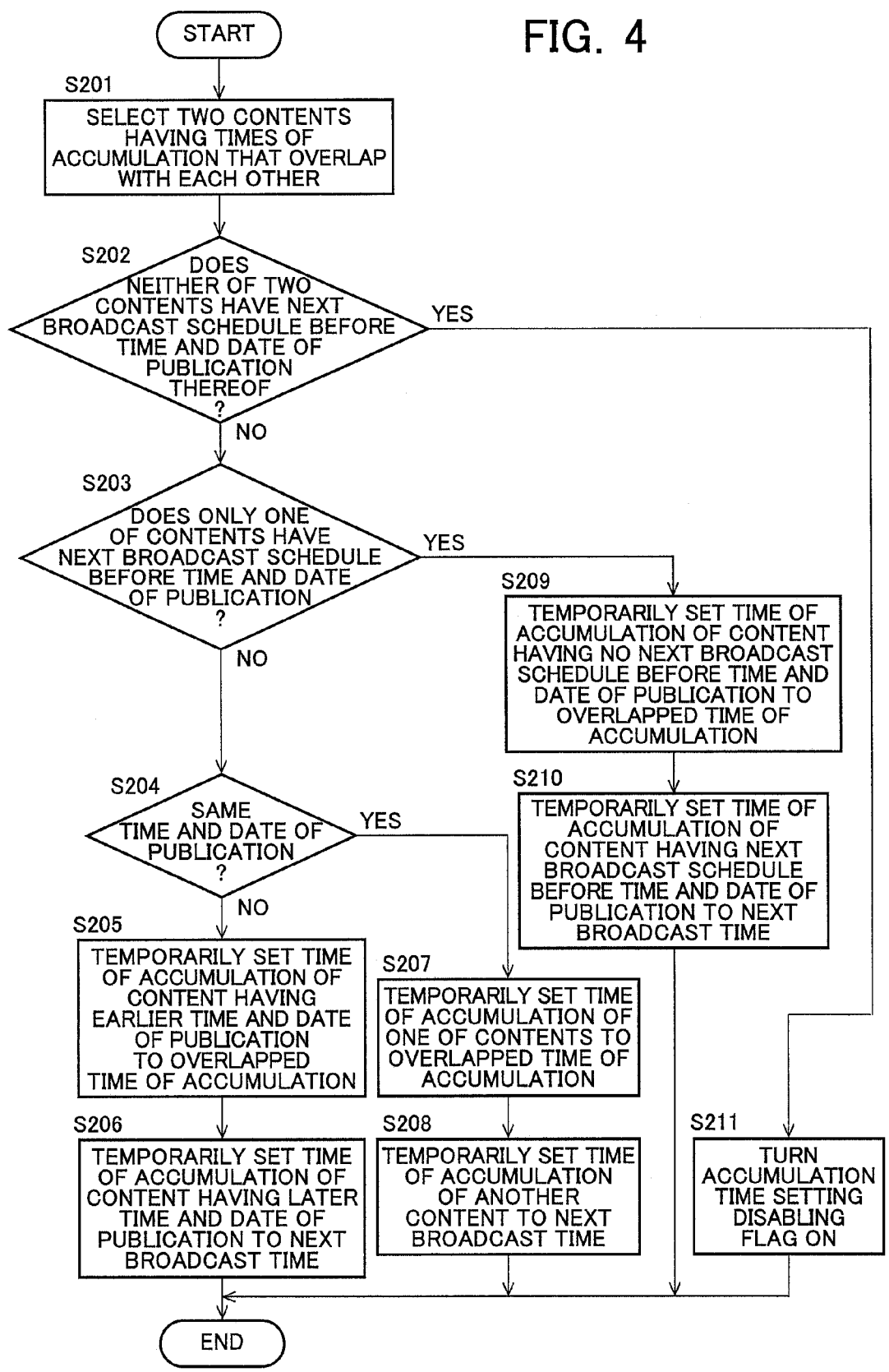
FIG. 4 is a flowchart showing an example of a processing procedure of overlapping resolution processing shown in FIG. 3.

Next, description will be given for an example of a processing procedure of content accumulation time setting processing according to the present invention. FIG. 3 is a flowchart showing the example of the processing procedure of the content accumulation time setting processing according to the present invention, and FIG. 4 is a flowchart showing an example of a processing procedure of overlapping resolution processing shown in FIG. 3.

As shown in FIG. 3, first, the accumulation time setting portion 24b of the content reception device 10 selects a processing target content (in FIG. 2, content A, for example) (step S101).

For example, in the case of receiving a setting operation of an accumulation reservation of a content by a user via the input portion 21, the content is selected as a processing target content. Moreover, in the case of unsuccessfully accumulating a content and receiving a setting request of a time of accumulation of the content from the content accumulation portion 24c, the content unsuccessfully accumulated is selected as a processing target content. Further, in the case of making an accumulation reservation of a content by the automatic reservation function of the accumulation time setting portion 24b, the content is selected as a processing target content.

Thereafter, the accumulation time setting portion 24b temporarily sets a time of accumulation of the processing target content to a next broadcast time of the content (step S102). Then, the accumulation time setting portion 24b determines if that are contents having times of accumulation that overlap with that of the processing target content (step S103).

In a case where there is no content having the time of accumulation that overlaps with that of the processing target content (in the case of NO at step S102), the accumulation time setting portion 24b determines whether or not a time and date to start accumulation of the temporarily set time of accumulation is earlier than a time and date of publication thereof (step S109).

In a case where the time and date to start accumulation of the temporarily set time of accumulation is not earlier than the time and date of publication thereof (in the case of NO at step S109), the accumulation time setting portion 24b outputs a message indicating that it is impossible to set the time of accumulation to the reproduction control portion 17 to display the message on the video output portion 18 (step S110). Then, the content accumulation time setting processing is finished.

In a case where the time and date to start accumulation of the temporarily set time of accumulation is earlier than the time and date of publication thereof (in the case of YES at step S109), the accumulation time setting portion 24b sets a time of accumulation of a content having a time of accumulation that has not been eventually set after the time of accumulation was temporarily set to the temporarily set time of accumulation (step S107).

Then, the accumulation time setting portion 24b outputs a list of information of times of accumulation of respective contents to the reproduction control portion 17 to display the list of information on the video output portion 18 (step S108). The content accumulation time setting processing is then finished.

In a case where there is a content having a time of accumulation that overlaps with that of the processing target content at step S103 (in the case of YES at step S103), the accumulation time setting portion 24b executes overlapping resolution processing (step S104).

Specifically, as shown in FIG. 4, the accumulation time setting portion 24b selects two contents of the processing target content and a content which have times of accumulation that overlap with each other (step S201). In the example of FIG. 2, the accumulation time setting portion 24b selects the content A and the content B.

The accumulation time setting portion 24b then determines whether or not neither of the two contents has next broadcast schedule to be started before a time and date of publication thereof (step S202). In a case where neither of the two contents has a next broadcast schedule to be started before the time and date of publication thereof (in the case of YES at step S202), the accumulation time setting portion 24b is not allowed to set a time and date to start accumulation of the contents before the time and date of publication, thus turning an accumulation time setting disabling flag on (step S211). Then, the overlapping resolution processing is finished to execute step S105 and subsequent processing thereof in FIG. 3.

That is, as shown at step S105 of FIG. 3, the accumulation time setting portion 24b determines whether or not the accumulation time setting disabling flag is turned on (step S105). Then, in a case where the accumulation time setting disabling flag is turned on (in the case of YES at step S105), the accumulation time setting portion 24b outputs a message indicating that it is impossible to set the time of accumulation to the reproduction control portion 17 to display the message on the video output portion 18 (step S110). Then, the content accumulation time setting processing is finished.

At step S202 of FIG. 4, in the case of not satisfying a condition that neither of the two contents has a next broadcast schedule to be started before the time and date of publication thereof (in the case of NO at step S202), the accumulation time setting portion 24b determines whether or not only one of the contents has a next broadcast schedule to be started before a time and date of publication thereof (step S203).

In the example of FIG. 2, the content A has the next broadcast schedule (from 0:00 on Feb. 15, 2011 to 0:30 on Feb. 15, 2011) to be started before a time and date of publication thereof (0:00 on Mar. 1, 2011), and the content B also has the next broadcast schedule (from 0:00 on Feb. 15, 2011 to 0:30 on Feb. 15, 2011) to be started before a time and date of publication thereof (0:00 on Apr. 15, 2011).

The accumulation time setting portion 24b thus determines that a condition that neither of the two contents has a next broadcast schedule to be started before the time and date of publication thereof is not satisfied (NO at step S202). Further, since both the contents A and B have next broadcast schedules to be started before the times and dates of publication thereof, the accumulation time setting portion 24b determines that a condition that only one of the contents does not have a next broadcast schedule to be started before a time and date of publication thereof is not satisfied (NO at step S203).

In the case of not satisfying a condition that only one of the contents does not have a next broadcast schedule to be started before a time and date of publication thereof (in the case of NO at step S203), the accumulation time setting portion 24b determines whether or not the two contents have the same time and date of publication (step S204).

In a case where the two contents do not have the same time and date of publication (in the case of NO at step S204), the accumulation time setting portion 24b temporarily sets a time of accumulation of a content having an earlier time and date of publication to an overlapped time of accumulation (step S205). In the example of FIG. 2, since the time and date of publication of the content A (0:00 on Mar. 1, 2011) and the time and date of publication of the content B (0:00 on Apr. 1, 2011) are different, the accumulation time setting portion 24b temporarily sets a time of accumulation of the content A having a time and date of publication earlier than that of the content B to an overlapped time of accumulation (from 0:00 on Feb. 1, 2011 to 0:30 on Feb. 1, 2011).

The accumulation time setting portion 24b then temporarily sets a time of accumulation of a content having a later time and date of publication to a next broadcast time of the content (step S206). In the example of FIG. 2, the accumulation time setting portion 24b temporarily sets a time of accumulation of the content B having a time and date of publication later than that of the content A to the next broadcast time of the content B (from 0:00 on Feb. 15, 2011 to 0:30 on Feb. 15, 2011). Thus, the overlapping resolution processing is finished.

Subsequently, as shown at step S105 of FIG. 3, the accumulation time setting portion 24b determines whether or not an accumulation time setting disabling flag is turned on (step S105). In a case where the accumulation time setting disabling flag is not turned on (in the case of NO at step S105), the accumulation time setting portion 24b determines whether or not to have a content having a time of accumulation that overlaps with that of another content (step S106).

In a case where there is a content having a time of accumulation that overlaps with that of another content (in the case of YES at step S106), the accumulation time setting portion 24b executes the overlapping resolution processing at step S104 again (step S104).

That is, as shown in FIG. 4, the accumulation time setting portion 24b selects two contents having times of accumulation that overlap with each other (step S201). In the example of FIG. 2, the accumulation time setting portion 24b selects the content B and the content C since times of accumulation of the content B and the content C which are temporarily set (from 0:00 on Feb. 15, 2011 to 0:30 on Feb. 15, 2011) overlap with each other.

The accumulation time setting portion 24b then executes processing at step S202 described above. In the example of FIG. 2, the content B has the next broadcast schedule (from 0:00 on Mar. 15, 2011 to 0:30 on Mar. 15, 2011) to be started before a time and date of publication thereof (0:00 on Apr. 1, 2011), and the content C also has the next broadcast schedule (from 0:00 on Mar. 15, 2011 to 0:30 on Mar. 15, 2011) to be started before a time and date of publication thereof (0:00 on Jul. 1, 2011), so that the accumulation time setting portion 24b determines that a condition that neither of the two contents has a next broadcast schedule to be started before a time and date of publication thereof is not satisfied (NO at step S202).

In the case of not satisfying a condition that neither of the two contents has next broadcast schedules to be started before times and dates of publication thereof (in the case of NO at step S202), the accumulation time setting portion 24b executes processing at step S203 described above. In the example of FIG. 2, as described above, since both the contents B and C have next broadcast schedules to be started before times and dates of publication thereof, the accumulation time setting portion 24b determines that a condition that only one of the contents does not have a next broadcast schedule to be started before a time and date of publication thereof is not satisfied (NO at step S203).

The accumulation time setting portion 24b then executes processing from step S204 to step S206 described above again. In the example of FIG. 2, since the time and date of publication of the content B (0:00 on Apr. 1, 2011) and the time and date of publication of the content C (0:00 on Jul. 1, 2011) are different, the accumulation time setting portion 24b temporarily sets a time of accumulation of the content B having a time and date of publication earlier than that of the content C to the overlapped time of accumulation (from 0:00 on Feb. 15, 2011 to 0:30 on Feb. 15, 2011).

Subsequently, the accumulation time setting portion 24b temporarily sets a time of accumulation of the content C having a time and date of publication later than that of the content B to the next broadcast time of the content C (from 0:00 on Mar. 15, 2011 to 0:30 on Mar. 15, 2011). The overlapping resolution processing is thus finished and step S105 and the subsequent processing as described above is executed.

In the example of FIG. 2, at step S105 of FIG. 3, since the accumulation time setting flag is not turned on (NO at step S105), the accumulation time setting portion 24b determines at step S106 whether or not there is a content having a time of accumulation that overlaps with that of another content (step S106).

Subsequently, as a result of temporary setting of the time of accumulation of the content C to the next broadcast time thereof, times of accumulation of the contents C, D, and E overlap with each other, the accumulation time setting portion 24b thus determines that there is a content having a time of accumulation that overlaps with that of another content (YES at step S106), and executes the overlapping resolution processing at step S104 again (step S104).

That is, as shown in FIG. 4, the accumulation time setting portion 24b selects two contents having times of accumulation that overlap with each other (step S201). In FIG. 2, for example, the accumulation time setting portion 24b selects the content D and the content E since times of accumulation of the contents D and the contents E having times of accumulation temporarily set (from 0:00 on Mar. 15, 2011 to 0:30 on Mar. 15, 2011) overlap with each other. Note that, the accumulation time setting portion 24b may select the content C and the content D, or the content C and the content E.

The accumulation time setting portion 24b then executes processing at step S202 described above. In the example of FIG. 2, since both the contents D and E have next broadcast schedules (from 0:00 on Jun. 1, 2011 to 0:30 on Jun. 1, 2011, and from 0:00 on May 1, 2011 to 0:30 on May 1, 2011) to be started before times and dates of publication thereof (0:00 on Jun. 15, 2011), the accumulation time setting portion 24b determines that a condition that neither of two contents has a next broadcast schedule to be started before a time and date of publication thereof is not satisfied (NO at step S202).

In the case of not satisfying a condition that neither of two contents has a next broadcast schedule to be started before a time and date of publication thereof (in the case of NO at step S202), the accumulation time setting portion 24b executes processing at step S203 described above. In the example of FIG. 2, as described above, since both the contents D and E have next broadcast schedules to be started before times and dates of publication thereof, a condition that only one of the contents does not have a next broadcast schedule to be started before a time and date of publication thereof is not satisfied (NO at step S203).

In this case, the accumulation time setting portion 24b executes processing at step S204 described above. In a case where the two contents have the same time and date of publication (in the case of YES at step S204), the accumulation time setting portion 24b temporarily sets a time of accumulation of any one of the two contents to an overlapped time of accumulation (step S207). In FIG. 2, since the content D and the content E have the same time and date of publication (YES at step S204), the accumulation time setting portion 24b temporarily sets a time of accumulation of the content D to an overlapped time of accumulation (from 0:00 on Mar. 15, 2011 to 0:30 on Mar. 15, 2011), for example (step S207).

The accumulation time setting portion 24b then temporarily sets a time of accumulation of the other content to a next broadcast time of the content (step S208). In the example of FIG. 2, the accumulation time setting portion 24b temporarily sets a time of accumulation of the content E to the next broadcast time of the content E (from 0:00 on May 1, 2011 to 0:30 on May 1, 2011) (step S208). Subsequently, the overlapping resolution processing is finished and step S105 and subsequent processing thereof in FIG. 3 is executed.

In the example of FIG. 2, at step S105 of FIG. 3, since an accumulation time setting disabling flag is not turned on (NO at step S105), the accumulation time setting portion 24b determines whether or not to have a content having a time of accumulation that overlaps with that of another content (step S106).

In the example of FIG. 2, although a time of accumulation of the content E is temporarily set to the next broadcast time of the content E, times of accumulation of the contents C and D are still overlapped, and thus the accumulation time setting portion 24b determines that there is a content having a time of accumulation that overlaps with that of another content (YES at step S106), and executes overlapping resolution processing at step S104 again (step S104).

That is, as shown in FIG. 4, the accumulation time setting portion 24b selects two contents of the processing target content and a content which have times of accumulation that overlap with each other (step S201). In the example of FIG. 2, the accumulation time setting portion 24b selects the content C and the content D since times of accumulation of the contents C and the contents D having times of accumulation temporarily set (from 0:00 on Mar. 15, 2011 to 0:30 on Mar. 15, 2011) overlap with each other.

The accumulation time setting portion 24b then executes processing at step S202 described above. In the example of FIG. 2, although the content D has a next broadcast schedule (from 0:00 on Jun. 1, 2011 to 0:30 on Jun. 1, 2011) to be started before a time and date of publication thereof (0:00 on Jun. 15, 2011), the content C has no next broadcast schedule (a next broadcast time of the content C is from 0:00 on Jul. 15, 2011 to 0:30 on Jul. 15, 2011) to be started before a time and date of publication thereof (0:00 on Jul. 1, 2011), and thus the accumulation time setting portion 24b determines that a condition that neither of the two contents has a next broadcast schedule to be started before a time and date of publication thereof is not satisfied (NO at step S202).

In the case of not satisfying a condition that neither of the two contents has a next broadcast schedule to be started before a time and date of publication thereof (in the case of NO at step S202), the accumulation time setting portion 24b executes processing at step S203 described above. In the example of FIG. 2, only the content C does not have a next broadcast schedule to be started before a time and date of publication thereof (YES at step S203).

In this case, the accumulation time setting portion 24b temporarily sets a time of accumulation of a content having no next broadcast schedule to be started before a time and date of publication thereof to an overlapped time of accumulation (step S209). In the example of FIG. 2, the accumulation time setting portion 24b temporarily sets a time of accumulation of the content C having no next broadcast schedule to be started before a time and date of publication thereof to an overlapped time of accumulation (from 0:00 on Mar. 15, 2011 to 0:30 on Mar. 15, 2011).

Subsequently, the accumulation time setting portion 24b temporarily sets a time of accumulation of a content having a next broadcast schedule to be started before a time and date of publication thereof to a next broadcast time of the content (step S210). In the example of FIG. 2, the accumulation time setting portion 24b temporarily sets a time of accumulation of the content D having a next broadcast schedule to be started before a time and date of publication thereof to the next broadcast time (from 0:00 on Jun. 1, 2011 to 0:30 on Jun. 1, 2011). The overlapping resolution processing is then finished and step S105 and subsequent processing thereof in FIG. 3 is executed.

That is, the accumulation time setting portion 24b determines whether or not an accumulation time setting disabling flag is turned on (step S105). In a case where the accumulation time setting disabling flag is not turned on (in the case of NO at step S105), the accumulation time setting portion 24b determines whether or not to have a content having a time of accumulation that overlaps with that of another content (step S106).

In the example of FIG. 2, overlapping of times of accumulation between the content C and the content D is resolved, and thus the accumulation time setting portion 24b determines that there is no content having a time of accumulation that overlaps with that of another content (NO at step S106).

In a case where there is no content having a time of accumulation that overlaps with that of another content at step S106 (in the case of NO at step S106), the accumulation time setting portion 24b sets a time of accumulation of a content having a time of accumulation that has not been eventually set after the time of accumulation was temporarily set to the temporarily set time of accumulation (step S107).

In the example of FIG. 2, the accumulation time setting portion 24b sets a time of accumulation of the content A to the temporarily set time of accumulation from 0:00 on Feb. 1, 2011 to 0:30 on Feb. 1, 2011; a time of accumulation of the content B to the temporarily set time of accumulation from 0:00 on Feb. 15, 2011 to 0:30 on Feb. 15, 2011; a time of accumulation of the content C to the temporarily set accumulation time from 0:00 on Mar. 15, 2011 to 0:30 on Mar. 15, 2011; a time of accumulation of the content D to the temporarily set time of accumulation from 0:00 on Jun. 1, 2011 to 0:30 on Jun. 1, 2011; and a time of accumulation of the content E to the temporarily set time of accumulation from 0:00 on May 1, 2011 to 0:30 on May 1, 2011.

Subsequently, the accumulation time setting portion 24b outputs a list of information of times of accumulation of each content to the reproduction control portion 17 to display the list of information on the video output portion 18 (step S108). In the example of FIG. 2, the accumulation time setting portion 24b outputs a list of information of times of accumulation of the contents A to E described above to the reproduction control portion 17 to display the list of information on the video output portion 18. The content accumulation time setting processing is thus finished.

Description has so far been given mainly for embodiments of the content reception device and the content accumulation method, however, the present invention is not limited to these embodiments, and the present invention may be implemented as a form of a computer program for realizing functions of the content reception device, or a form of a computer-readable recording medium having the computer program recorded thereon.

In the embodiments, various forms of recording media are allowed to be employed including disc types (for example, a magnetic disc, an optical disc and the like), card types (for example, a memory card, an optical card and the like), semiconductor memory types (for example, a ROM, a non-volatile memory and the like), tape types (for example, a magnetic tape, a cassette tape and the like), and the like.

Computer programs that realize the functions of the content reception device in the above-described embodiments or computer programs that cause a computer to execute the content accumulation method are recorded on these recording media to be distributed, thereby making it possible to reduce cost and to improve portability and general versatility.

Subsequently, a computer is equipped with the above-described recording medium, then the computer program that is recorded in the recording medium is read by the computer to be stored in a memory, and a processer provided in the computer (CPU: Central Processing Portion, MPU: Micro Processing Portion) reads the computer program from the memory to execute, so that it is possible to realize the functions of the content reception device according to the present embodiments and execute the content accumulation method.

Further, the present invention is not limited to the above-described embodiments, and various changes and modifications are able to be made without departing from the spirit of the present invention. For example, in the above-described embodiments, in a case where a time and date to start accumulation of a content is later than a time and date of publication of the content, the accumulation time setting portion 24b outputs a message indicating that it is impossible to set a time of accumulation to the reproduction control portion 17 to display the message on the video output portion 18, and finishes accumulation time setting processing, however, the accumulation time setting portion 24b may set a time and date to start accumulation of the content to a time and date which is later than the time and date of publication.

EXPLANATIONS OF LETTERS OR NUMERALS

10 . . . content reception device; 11 . . . antenna; 12 . . . tuner; 13 . . . demultiplexer; 14 . . . PSI/SI processing portion; 15 . . . data carousel reception processing portion; 16 . . . video/audio decoding portion; 17 . . . reproduction control portion; 18 . . . video output portion; 19 . . . audio output portion; 20 . . . clock portion; 21 . . . input portion; 22 . . . volatile storage portion; 23 . . . non-volatile storage portion; 23a . . . content broadcast information; 23b . . . content publication time information; 23c . . . accumulation reservation information; 23d . . . accumulated content; 24 . . . control portion; 24a . . . publication time information obtaining portion; 24b . . . accumulation time setting portion; 24c . . . content accumulation portion; and 24d . . . content reproduction portion.

The invention claimed is:

1. A content reception device for receiving a plurality of contents, comprising:
    a storage portion for storing information regarding times of publication of the plurality of contents;
    an accumulation time setting portion for determining, in a case where candidate times for times of accumulation of the plurality of contents overlap with each other, an order of the times of publication among the plurality of contents on the basis of the information regarding the times of publication stored in the storage portion, and setting a time of accumulation for each content on the basis of the determination result; and
    a content accumulation portion for accumulating the each content on the basis of times of accumulation set by the accumulation time setting portion, wherein
    the plurality of contents include a first content and a second content;
    the accumulation time setting portion determines, in a case where a candidate time for a time of accumulation of the first content and a candidate time for a time of accumulation of the second content overlap with each other, an order of times of publication between the first content and the second content, sets a time of accumulation of the first content to the candidate time for the time of accumulation of the first content in a case where a time of publication of the second content is later than a time of publication of the first content, and sets a time of accumulation of the second content to a time when the second content is broadcasted which is later than the candidate time for the time of accumulation of the first content, and
    the accumulation time setting portion sets, in a case where a time of accumulation of the second content is later than a time of publication of the second content, a time of accumulation of the second content to a candidate time for a time of accumulation of the first content and a time of accumulation of the first content to a time when the first content is broadcasted which is later than the candidate time for the time of accumulation of the first content.

2. The content reception device as defined in claim 1, wherein the plurality of contents further include a third content; and the accumulation time setting portion determines, in a case where a time when the second content is broadcasted and a candidate time for a time of accumulation of the third content overlap with each other, an order of times of publication between the second content and the third content, and sets a time of accumulation of the third content to a time when the third content is broadcasted which is later than a time of accumulation of the second content in a case where a time of publication of the third content is later than a time of publication of the second content.

3. The content reception device as defined in claim 1, wherein the accumulation time setting portion sets a time of accumulation of the first content to a time when the first content is broadcasted which is earlier than a time of publication of the first content.

4. A content accumulation method for accumulating a plurality of contents, comprising:
    an accumulation time setting step of reading, in a case where candidate times for times of accumulation of the plurality of contents overlap with each other, information regarding times of publication of the plurality of contents from a storage portion, determining an order of the times of publication among the plurality of contents on the basis of the read information regarding the times of publication, and setting a time of accumulation for each content on the basis of the determination result; and
    a content accumulation step of accumulating the each content on the basis of times of accumulation set at the accumulation time setting step, wherein
    the plurality of contents include a first content and a second content;
    the accumulation time setting step determines, in a case where a candidate time for a time of accumulation of the first content and a candidate time for a time of accumulation of the second content overlap with each other, determining an order of times of publication between the first content and the second content, setting a time of accumulation of the first content to the candidate time for the time of accumulation of the first content in a case where a time of publication of the second content is later than a time of publication of the first content, and setting a time of accumulation of the second content to a time when the second content is broadcasted which is later than the candidate time for the time of accumulation of the first content, and
    the accumulation time setting step includes, in a case where a time of accumulation of the second content is later than a time of publication of the second content, setting a time of accumulation of the second content to a candidate time for a time of accumulation of the first content and a time of accumulation of the first content to a time when the first content is broadcasted which is later than the candidate time for the time of accumulation of the first content.

* * * * *